No. 838,449. PATENTED DEC. 11, 1906.
E. H. PRATT.
DRAFT ATTACHMENT.
APPLICATION FILED JUNE 1, 1906.
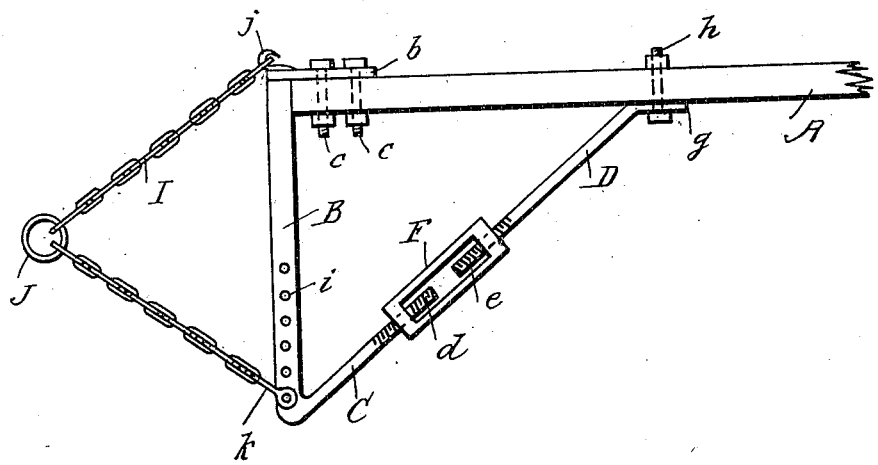
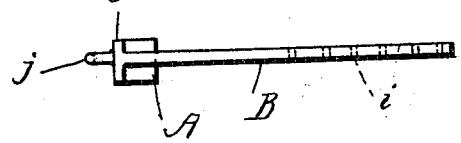
WITNESSES:
INVENTOR
Earle H. Pratt
BY Herbert W. T. Jenner.
Attorney

UNITED STATES PATENT OFFICE.

EARLE H. PRATT, OF MILWAUKEE, WISCONSIN.

DRAFT ATTACHMENT.

No. 838,449.  Specification of Letters Patent.  Patented Dec. 11, 1906.

Application filed June 1, 1906. Serial No. 319,702.

*To all whom it may concern:*

Be it known that I, EARLE H. PRATT, a citizen of the United States, residing at Milwaukee, in the county of Milwaukee and State of Wisconsin, have invented certain new and useful Improvements in Draft Attachments; and I do hereby declare the following to be a full, clear, and exact description of the invention, such as will enable others skilled in the art to which it appertains to make and use the same.

This invention relates to draft attachments for plows and other implements having draft poles or beams; and it consists in the novel construction and combination of the parts hereinafter fully described and claimed.

In the drawings, Figure 1 is a plan view of the draft attachment. Fig. 2 is a front view of the draft-arm.

A is a draft-pole, such as the beam of a plow used in cultivating orchards. B is an arm having a lug $b$ at one end, which is secured to one side of the end portion of the said draft-pole by bolts $c$. C is a projection at the other end of the said arm, which is arranged at an acute angle to the said arm and provided with a screw-threaded portion $d$. D is a rod which has a screw-threaded portion $e$ at one end, and the said screw-threaded portions $d$ and $e$ have their screw-threads arranged right and left. F is a turnbuckle which couples together the said screw-threaded portions. The other end of the rod D is provided with a lug $g$, which is secured to the draft-pole by a bolt $h$.

The end portion of the arm B nearest the projection C is provided with a series of holes $i$, and the lug $b$ is provided with a hook $j$, which projects forwardly from it.

I is a chain provided with a shackle $k$ at one end, the pin of which engages with any of the holes $i$. The other end of the chain is adjustably connected with the said hook, and the middle part of the chain is provided with a ring J for connection with the harness of the animal used to draw the plow.

This device is specially useful in plowing orchards and for plowing close up to fences, but may be used in any other way, as may be found convenient.

What I claim is—

In a draft attachment, the combination, with a draft-pole, of an arm secured at one end to the said pole and projecting laterally of it on one side only, said arm being provided at its outer end with a series of holes and having also a projection arranged at an acute angle to its main part and terminating in a screw-threaded portion, a rod secured to the said pole in line with the said projection and provided with a screw-threaded end portion, a turnbuckle coupling the said end portions, and a chain attached to the inner end of the said arm and provided with a draft-ring at its middle part and having a shackle at its outer end for engaging with any one of the said holes.

In testimony whereof I have affixed my signature in the presence of two witnesses.

E. H. PRATT.

Witnesses:
 WM. CUMMINGS,
 M. S. SHERIDAN.